(12) United States Patent
Lin

(10) Patent No.: US 8,693,803 B2
(45) Date of Patent: Apr. 8, 2014

(54) HIGH LINEAR DYNAMIC RANGE IMAGING

(75) Inventor: Shih-Schon Lin, Philadelphia, PA (US)

(73) Assignee: The Trustees of the University of Pennsylvania, Philadelpha, PA (US)

(*) Notice: Subject to any disclaimer, the term of this patent is extended or adjusted under 35 U.S.C. 154(b) by 843 days.

(21) Appl. No.: 12/677,689

(22) PCT Filed: Sep. 12, 2008

(86) PCT No.: PCT/US2008/076200
§ 371 (c)(1),
(2), (4) Date: Aug. 3, 2010

(87) PCT Pub. No.: WO2009/036292
PCT Pub. Date: Mar. 19, 2009

(65) Prior Publication Data
US 2010/0302399 A1 Dec. 2, 2010

Related U.S. Application Data

(60) Provisional application No. 60/972,668, filed on Sep. 14, 2007.

(51) Int. Cl.
*G06K 9/40* (2006.01)
(52) U.S. Cl.
USPC .......................................................... 382/275
(58) Field of Classification Search
USPC ......... 382/112, 128, 151, 206, 216, 218, 219, 382/275, 278, 282, 284, 287, 291, 293–295, 382/307; 345/648, 651, 655, 656, 641, 450; 358/452, 453, 486, 488, 496
See application file for complete search history.

(56) References Cited

U.S. PATENT DOCUMENTS

| | | | |
|---|---|---|---|
| 2002/0102013 A1* | 8/2002 | Smilansky | 382/129 |
| 2005/0171438 A1 | 8/2005 | Chen et al. | |
| 2006/0256215 A1* | 11/2006 | Zhang et al. | 348/243 |
| 2007/0025720 A1* | 2/2007 | Raskar et al. | 396/213 |

OTHER PUBLICATIONS

F. Xiao, J. DiCarlo, P. Catrysse, and B. Wandell, High dynamic range imaging of natural scenes, in IS&T/SID Tenth Color Imaging Conference, pp. 337-342, 2002.*

* cited by examiner

*Primary Examiner* — Andrae S Allison
(74) *Attorney, Agent, or Firm* — Baker & Hostetler LLP

(57) ABSTRACT

A method for digital processing comprises receiving a first set of image data corresponding to a first time and a second set of image data corresponding to a different time. Intensity values for each of a first pixel and second pixel are extracted from each of the first and second set of image data. Substantially linear values in a plurality of intensity values are identified for each of the first and second pixels. For each of the first and second pixels, regression is performed on each of the substantially linear values in the plurality of intensity values. The regression may calculate an intensity level as a function of exposure time. The regression may generate slopes corresponding to the linear values for each of the first and second pixels. These slopes more accurately represent the actual ratio of intensity values. The ratios are useful in applications, such as, for example, polarization.

22 Claims, 12 Drawing Sheets

HIGH LINEAR DYNAMIC RANGE IMAGING

CROSS-REFERENCE TO RELATED APPLICATIONS

This application is the National Stage of International Application No. PCT/US2008/076200 filed Sep. 12, 2008, which claims the benefit of U.S. Provisional Application No. 60/972,668, filed Sep. 14, 2007, the disclosures of which are incorporated herein by reference in their entirety.

FIELD OF THE EMBODIMENTS

The disclosed embodiments relate to image processing methods, and more particularly, to methods and systems for improving the dynamic range of an image processing system.

BACKGROUND

Digital cameras operate by sampling light intensity information from a scene or subject and recording the light intensity information as a set of numerical values. Ideally, a digital camera produces output values that are a linear representation of the light intensity of the viewed scene. In a hypothetical ideal camera, a zero light intensity level would be recorded as a zero numerical value. However, real-world digital cameras have design limitations that prevent them from operating in this ideal manner.

A digital camera's dynamic range limits the ability of a digital camera to accurately record extreme high and low intensity values. For example, an 8-bit camera is limited to recording 256 possible intensity values for any one pixel. If the camera is used to record a scene with intensity values that exceed the highest intensity values that the camera is adapted to record, the recorded intensity values for the pixels corresponding to those high intensity values may not accurately reflect the true intensity. This effect is sometimes referred to as "saturation." Analogously, if a scene has a very dark area that has intensity values that are lower than the lowest level of intensity that the camera is adapted to record, the recorded intensity values for the pixels corresponding to the low intensity area of the scene may not accurately reflect the true intensity. This effect is sometimes referred to as "undercut." The limited dynamic range exhibited by digital cameras results in a loss of some intensity information at the high and low ends of the intensity spectrum. As a consequence, digital cameras sometimes do not accurately record areas of high and low brightness.

Digital cameras are sometimes susceptible to digitization errors. For example, because an 8-bit camera has only 256 possible intensity values with which it can record the intensity of a scene, an area of a scene with many fine variations in intensity may not be accurately reflected in the recorded pixel values. Rather, the intensity levels are approximated to one of the 256 intensity values, even if there are many more variations in the actual scene. Variations in intensity levels that cannot be recorded with an 8-bit level of detail may be lost.

Digital cameras may also be affected by noise. The gain experienced in a camera's electronics may result in inaccurate intensity level recordings. The effect of noise is often particularly noticeable in areas of low intensity such as dark or shadowed areas.

Digital cameras may not accurately record in the low intensity range due to black-level fluctuation. Black-level fluctuation may occur where different pixels in a camera's image sensor have different output values for zero intensity. Dark areas of a subject/scene with zero light intensity may be represented with different numerical values, depending on which pixels recorded the image. The lack of consistency in recorded intensity values may contribute to inaccurate representation of a scene.

Digital cameras that exhibit one or more limitations may be acceptable for use in many applications. For example, some level of inaccuracy may be acceptable where the camera is for use in amateur photography. However, for other applications such as, for example, machine vision applications, high levels of accuracy are often required. In some machine vision applications, such as polarization vision computations, it is preferred that a camera generate high levels of accuracy with respect to scene intensity levels.

SUMMARY

Applicant discloses exemplary systems adapted to process digital image data. An exemplary system comprises a processor communicatively coupled to a memory. In an exemplary embodiment, the system may comprise a camera. The processor may be adapted to perform exemplary methods for processing image data to generate values that accurately reflect intensity levels received from a scene.

An exemplary method for processing image data comprises receiving a first set of image data corresponding to a first time. The method further comprises receiving at least one additional set of image data where each additional set of image data corresponds to a different time. In an exemplary embodiment, 30 sets of data may be received in an interval of ⅙ second. The image data may represent, for example, for each pixel, the intensity level of the energy received at the camera and the exposure time or linear scaling of the exposure time. Each time value, for example, may correspond to an exposure time for the corresponding set of image data.

An exemplary method further comprises extracting numerical values for each of a first pixel and second pixel from each of the first set of image data and at least one additional set of image data. For example, the response and exposure time at each of a first and second pixels may be extracted for each set of image data recorded over time.

An exemplary method further comprises identifying substantially linear values in the plurality of numerical values for each of the first and second pixels. For example, values that correspond to areas of saturation or undercut resulting from limitations of the camera may be removed from consideration.

For each of the first and second pixel and their respective substantially linear values, regression is performed on substantially linear subsets of each of the sets of values. In an exemplary embodiment, a least squares analysis is performed on the pixel data. The regression is performed using, for each pixel, the intensity values and the exposure time reading. The regression generates a slope corresponding to the linear values for each of the first and second pixels. Ratios between slope values may be generated.

The derived slope values for each of the pixels may thereafter be used in a variety of different ways. For example, the slope values may be used to display a representation of the image, stored for later use, or communicated to additional system components for further processing. For example, the slope values may be communicated for use in polarization processing.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

Applicants disclose exemplary camera systems and methods for improving digital camera accuracy. In an exemplary embodiment, a camera system generates a series of image data sets collected over an interval of time. Each data point collected comprises a value for intensity and exposure time. The exposure times are different between data point readings. The camera system detects and removes "saturation" and "undercut" data points. Thereafter, the camera system performs regression analysis on the remaining good data points (each data point consists of a recorded pixel value and an exposure time or a linearly scaled value of an exposure time) in order to arrive at values corresponding to intensity levels.

Exemplary Environment

Figure 1:
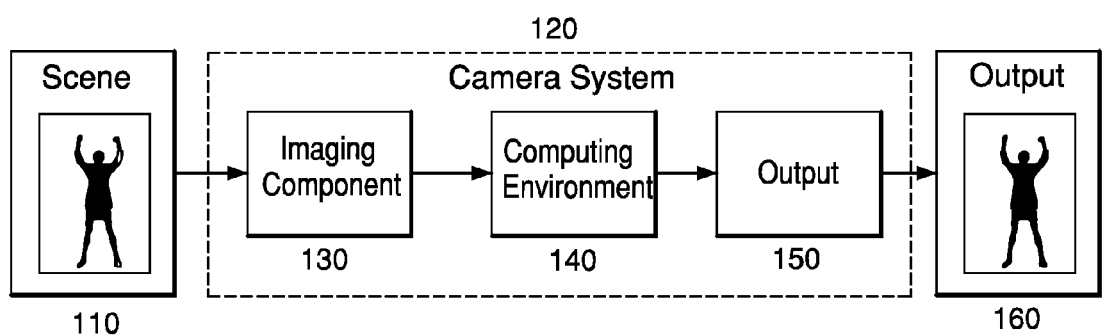
FIG. 1 is a high level diagram of a camera system with improved dynamic range.

FIG. 1 is a diagram depicting high-level functional components of an exemplary system with improved dynamic range. Scene 110 is the subject of an image to be taken by camera system 120. Scene 110 may be a person, a place, a combination, or anything else. Scene 110 may have any level of brightness and may be illuminated by any energy source, including, for example, visible light, ultra-violet, infra-red light.

Camera system 120 receives light or other energy reflected off of scene 110 and processes the reflected light to derive improved image data. Camera system 120 comprises imaging component 130 which receives and captures light reflected off of scene 110 and converts the reflected energy into a digital representation. Imaging component 130 is adapted to capture reflected energy from scene 110 at a plurality of intervals in time. For example, imaging component 130 may be adapted to receive 10 or more separate images each taken at a different exposure time. The digital representation created by imaging component 130 at a particular point in time may comprise a plurality of values with each value representing a discrete portion of the received image. For example, a digital representation may comprise intensity values for each of a plurality of pixels which when combined correspond to an image of the scene.

Imaging component 130 is communicatively coupled to computing component 140. Computing component 140 is adapted to receive the digital representations that are collected by imaging component 130 and process the digital representations to generate values that closely approximate the actual intensity levels received at the camera. An exemplary process performed by computing component 140 on the digital representation is described below in connection with FIG. 6. Generally, the processing may comprise first detecting and excluding "saturation" and "undercut" data points and then performing a regression analysis on the remaining good intensity values and exposure value data sets for each of the individual pixels in the digital representation.

The processed digital representation may be stored and eventually communicated to output device 150. Output device may be any type of device suitable for outputting the improved image data. For example, output device 150 may be an electrical display device, a printer, or even a peripheral port for communicating to another system for further processing.

Figure 2:
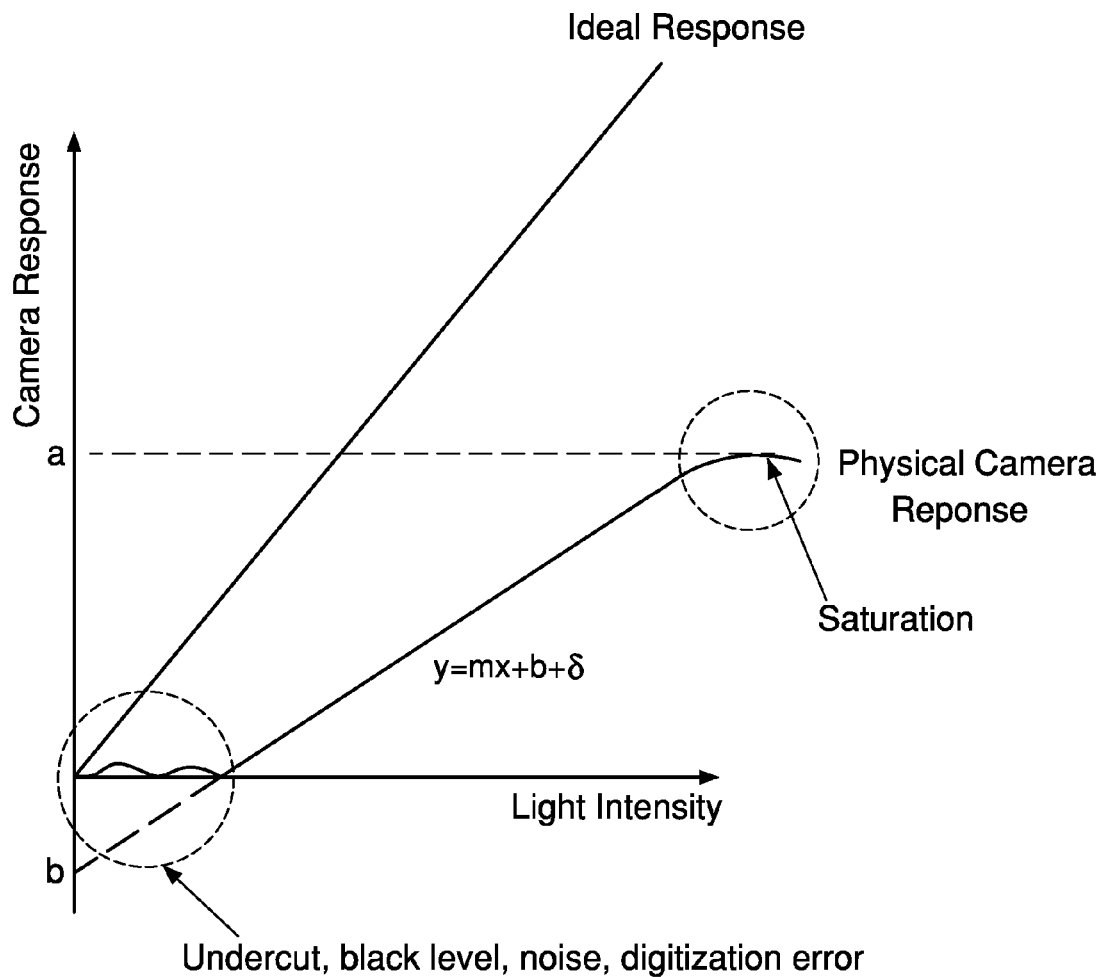
FIG. 2 is a diagram depicting a comparison of an ideal camera response for a given intensity to a real-world camera response.

FIG. 2 is a diagram depicting camera response as a function of light intensity for a hypothetical "ideal" camera and for a real-world physical camera. In particular, the value plotted on the x-axis is the actual light intensity received at a camera and the y-axis represents the pixel value generated by a camera in response to the actual light intensity. As shown, for the hypothetical "ideal" camera, the relationship between camera response and light intensity is entirely linear with zero y-intercept. Thus, the y-intercept "b" represents the theoretical output value at zero intensity level. For the ideal camera, whose graph has a mathematical representation of $y=mx$, a ratio of two intensities $x_1$ and $x_2$ may be easily calculated (if $y=mx$ then $y_2/y_1=mx_2/mx_1=x_2/x_1$).

Figure 3:
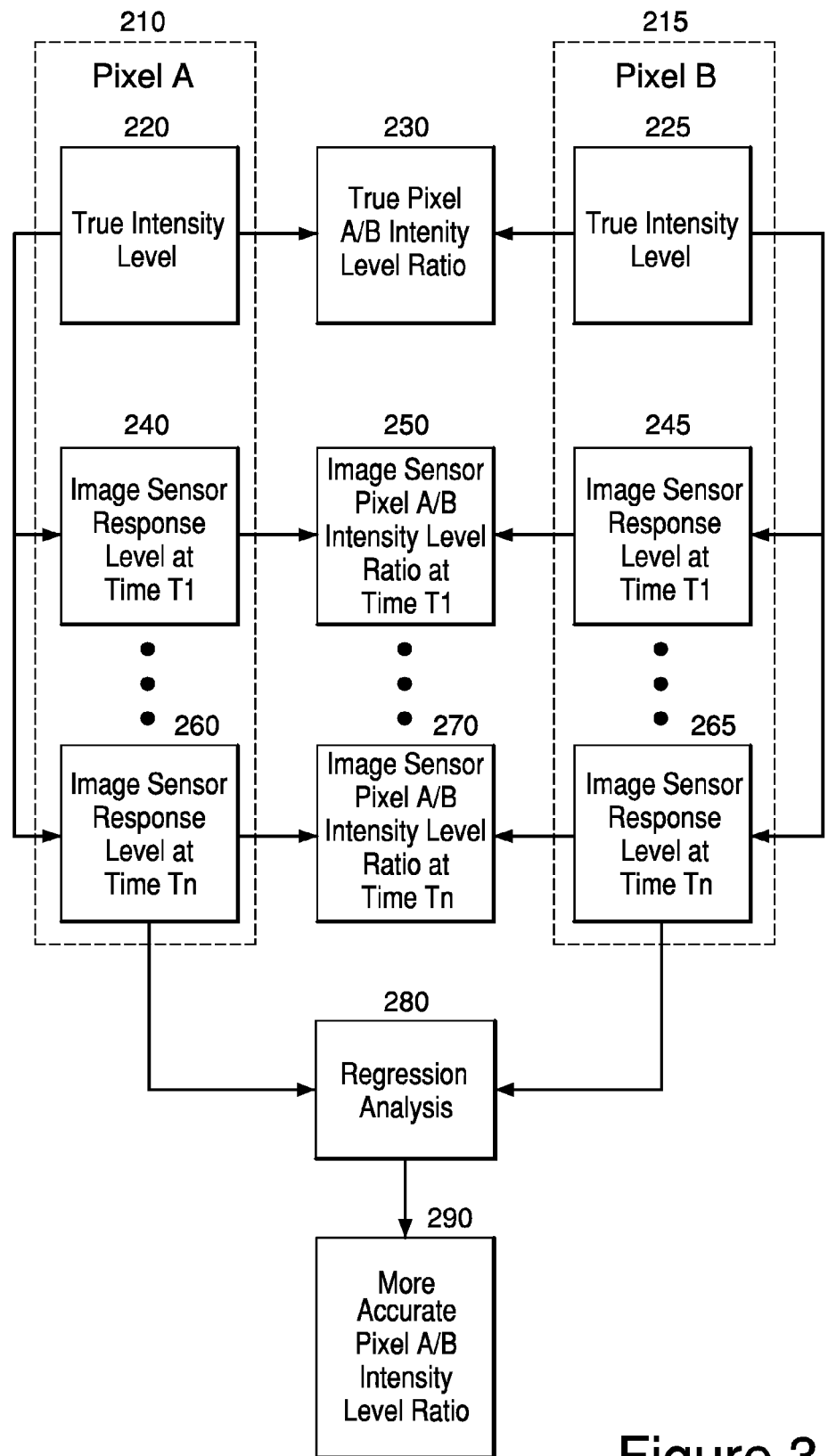
FIG. 3 is a flow diagram depicting a comparison of the intensity level ratio of two image pixels before and after performing regression analysis.

For a real-world camera, the relationship between camera response and light intensity is substantially linear for a portion of the response spectrum, but becomes non-linear at points corresponding to high and low intensity. Furthermore, real world cameras have noise (which may be represented by the term δ). As depicted in FIG. 3, the real world camera produces an output somewhat higher than the expected value of "b" at very low levels of light intensity. This deviation from the expected value is due to the limitations discussed above such as digitization error, noise, black-level fluctuation. For light intensities within the dynamic range of the real world camera, the relationship between the camera response and true light intensity is linear. However, once the actual light intensity reflected from a scene exceeds the dynamic range of the camera, saturation occurs, and the camera response curve flattens out. Once a pixel reaches the saturation level, the pixel outputs a constant response level no matter how high the intensity level received at the camera.

The non-zero value for "b" and the existence of noise δ creates a problem in computing ratios. Generally, for a non-ideal camera, $y2/y1=(mx1+b1+\delta1)/(mx2+b2+\delta2)$ which does not reduce to $x1/x2$ as in the case of an ideal camera. The difference in ratio values depends on the relative strength of b and δ compared to mx. Thus the impact of b and δ is greater when mx is smaller. In other words, the effect of b and δ is more significant in shadow and dark region. In existing digital cameras, the digitization error and the digital ratio limit are both more severe in the dark region as well. Thus, direct pixel value outputs from regular cameras are not readily adaptable for ratio computation, especially in those areas corresponding to dark areas.

The exemplary systems and method disclosed herein address this limitation in existing camera technology. In particular, the disclosed methods allow for the generation of intensity values that closely approximate the actual intensity values and for which ratios between intensity values are more readily created.

FIG. 3 is a flow diagram depicting a comparison of the intensity level ratio of two image pixels—Pixel A and Pixel B—before and after performing regression analysis as disclosed herein. Block 210 corresponds to Pixel A and block 215 corresponds to Pixel B. Pixels A and B may have been created, for example, from the input of light reflected off of scene 130. For each of Pixel A (220) and Pixel B (225), there is an actual or true intensity level of the energy received from scene 130. These actual intensity levels if compared in a ratio yield true pixel intensity ratio 230.

For pixel A, exemplary digital camera system 120 creates a sensor response reading 240 at a first point in time $T_1$. In other words, camera system 120 may record a picture at time $T_1$ and record values for a plurality of pixels including Pixel A. The recorded image data would also include a value for Pixel B at time $T_1$ (245). The intensity levels for both Pixel A and Pixel B, before further processing as described herein, may reflect standard digital camera limitations, such as limited dynamic range (i.e., saturation and undercut), digitization, noise, and non-zero black level fluctuation. As these limitations may be reflected in the intensity values for Pixel A and Pixel B, the ratio 250 between the values collected at time $T_1$ would also reflect these limitations.

At "n" successive points in time, image intensity level data may be collected for scene 110, each time using a different exposure time. As shown, in FIG. 3, for image data collected at time $T_n$, Pixel A has a recorded intensity value 260 and Pixel B has a recorded value 265. As was the case at time $T_1$, at time $T_n$ the intensity levels for both Pixel A and Pixel B, prior to any further processing as described herein, may reflect standard digital camera limitations, such as limited dynamic range (i.e., saturation and undercut), digitization, noise, and non-zero black level fluctuation. As these limitations may be reflected in the values for Pixel A and Pixel B, the ratio 270 between the values collected at time $T_n$ would also reflect these limitations. Those skilled in the art will appreciate that ratios 250 and 270 reflecting the recorded values for Pixels A and B and times $T_1$ and $T_n$ likely vary from the true intensity ratio 230.

In exemplary digital camera system 120, a regression analysis 280 is performed on the substantially linear values from the set of values corresponding to Pixel A at times $T_1$ through $T_n$, and the set of values corresponding to Pixel B at times $T_1$ through $T_n$. The regression analysis results in a pixel A/B intensity level ratio 290 that more accurately reflects an ideal intensity ratio than existed without the analysis.

Figure 4:
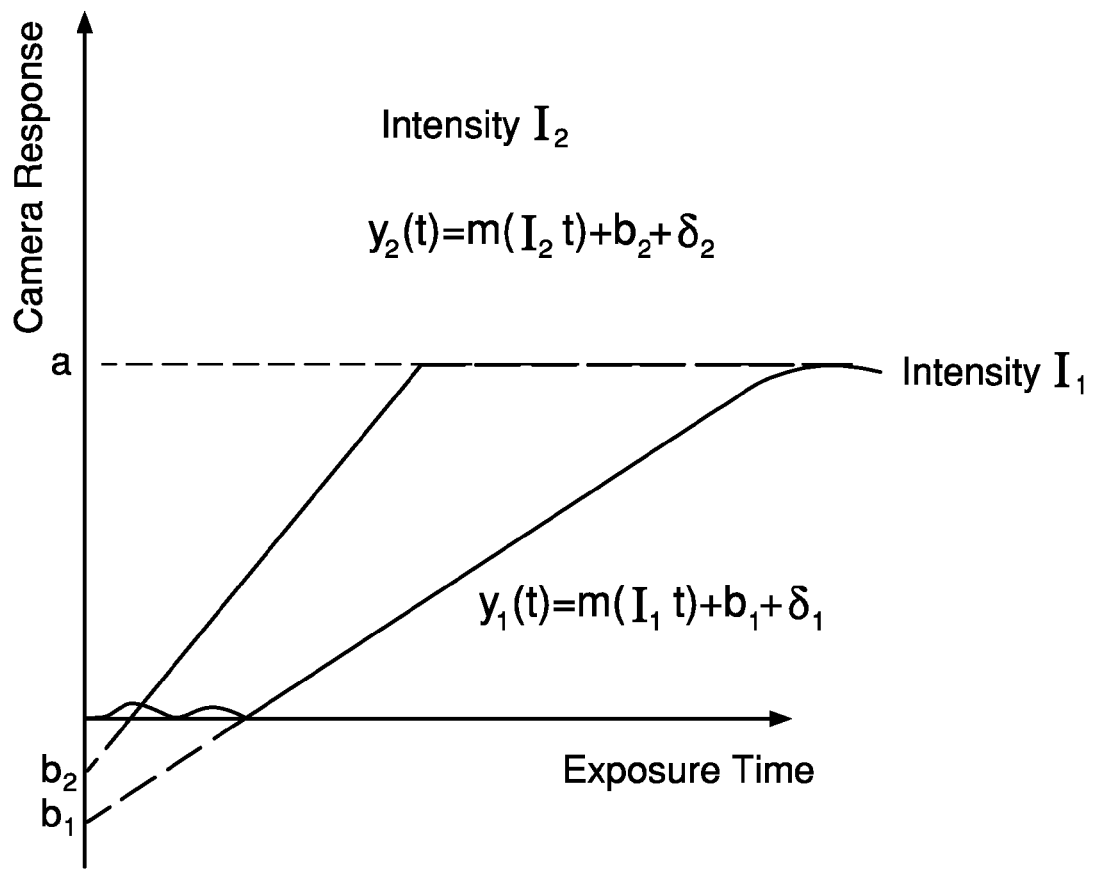
FIG. 4 is a diagram depicting a comparison of regression curves for two different actual intensity levels.

FIG. 4 is a diagram depicting a comparison of the response curves for two different pixels that respectively receive energy corresponding to two different intensity levels—$I_1$ and $I_2$. For purposes of discussion, the portion of the received image corresponding to a first Pixel A has an intensity level $I_1$. As depicted in FIG. 4, at an initial exposure time, a camera should have a theoretical value $b_1$. However, due to limitations in the camera, the actual response at the early interval is something greater than $b_1$. The response has a linear value as exposure time increases. The linear response has a slope of $m*I_1$, where m is a constant slope multiplier, dependant on the gain of the electronic components and the lens used. In some embodiments, the constant slope multiplier m may be the slope of an intensity response function of a sensor or camera used to collect the image data. Finally, as the exposure time increases, the response becomes saturated, which results in a maximum response value "a."

For a second portion of the received image corresponding to a second Pixel B, the intensity level $I_2$ is higher than the first intensity level $I_1$. Beginning at time $T_1$, the response has an expected theoretical value $b_2$, but in actuality, the response is something higher than $b_2$. Over time, the response becomes linear with the camera response increasing with increasing exposure time. The linear response for Pixel B has a slope of $m*I_2$. As shown, the slope m corresponding to intensity $I_2$ has a higher value than the slope corresponding to the intensity $I_1$ received at Pixel A. This higher slope is the result of the greater value of intensity $I_2$. Pixel B reaches saturation faster than pixel A, producing a maximum response at a lower exposure time.

In exemplary camera system 120, after data has been collected, a regression is performed on the substantially linear portions of the response curves. The slope $m*I_1$ and intercept $b_1$ is calculated for pixel A, and slope $m*I_2$ and intercept $b_2$ is calculated for pixel B. Dividing the resulting slope for pixel A by the slope for pixel B results in an intensity ratio that closely approximates the true intensity ratio for the actual intensity values.

Figure 5:
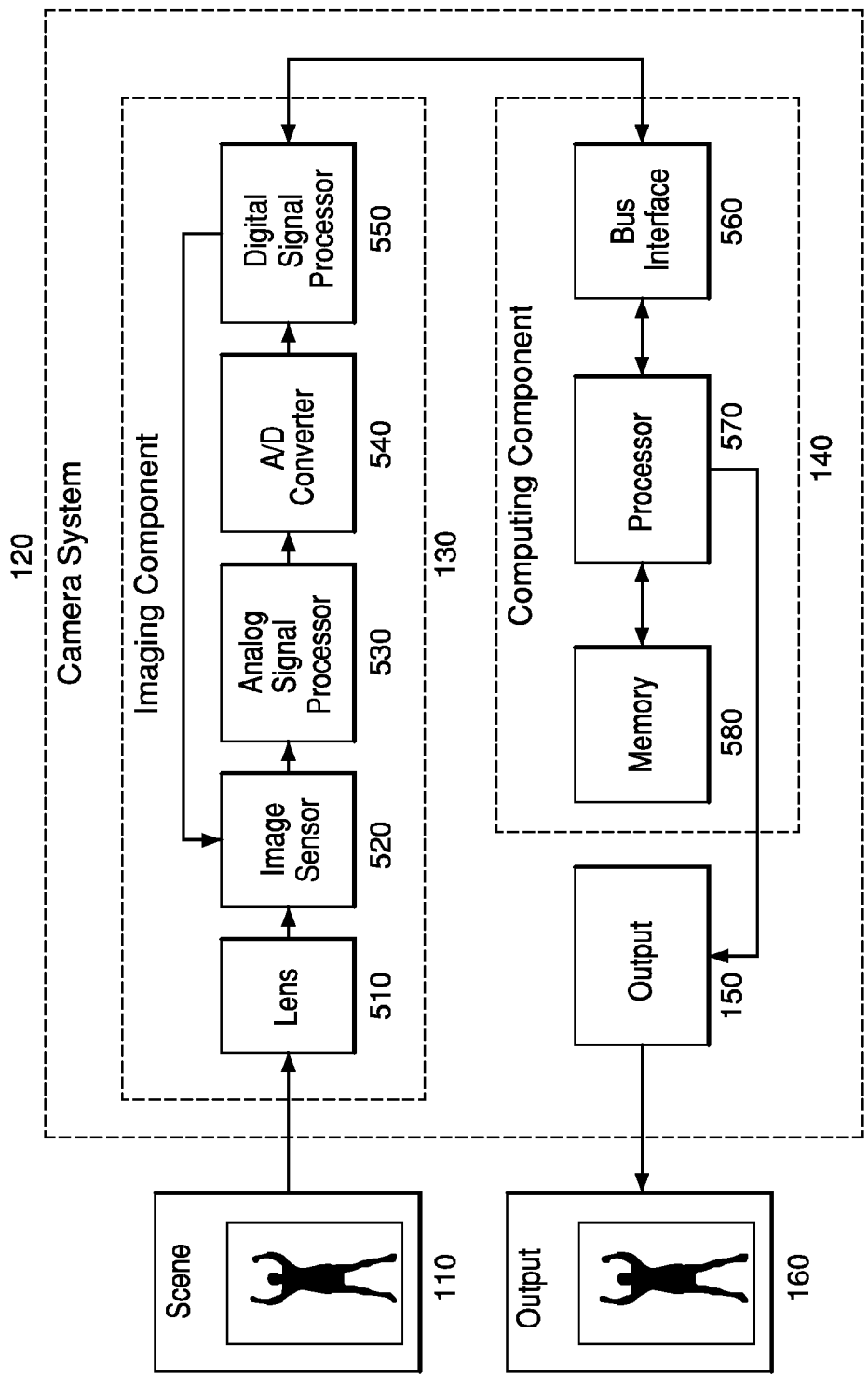
FIG. 5 is a diagram of a camera system with improved dynamic range.

FIG. 5 is a diagram depicting in greater detail the functional components of exemplary camera system 120. As shown, scene 110 is the target for which intensity level data is desired. Camera system 120 receives light or other energy reflected from scene 110. Scene 110 may be any image, of any level of brightness. Exemplary camera system 120 comprises imaging component 130, computing component 140, and output component 150.

Imaging component 130 is adapted to receive light reflected from scene 110 through lens 510. The light passing through lens 510 is received by image sensor 520, which then outputs an analog signal 530 to analog/digital converter 540. Analog/digital converter 540 sends a digital output signal to digital signal processor 550. Lens 510 may be any lens that is adapted to focus light onto an energy collecting device (image sensor 520). In an embodiment, lens 510 may be omitted such that reflected light or energy is directly received by image sensor 520. Image sensor 520 may be any sensor or device that is adapted to detect energy reflected off of scene 110 such as, for example, a CCD array.

In an exemplary embodiment, computing component 140 comprises bus interface 560 that receives information from digital signal processor 550. Bus interface 560 is communicatively coupled to processor 570. Processor 570 may be any computing processor adapted to perform the functions and methods described herein. The data received from bus interface 560 is output to processor 570, which performs computations on the image data that is collected and forwarded from imaging component 130. As described below in connection with FIG. 6, processor 570 may be programmed to perform a regression analysis on the received image data. Processor 570 may also be communicatively coupled with imaging component 130 so as to control image sensor 520. More particularly, processor 570 may be adapted to control image sensor 520 and the other components of imaging component 130 so as to collect the intensity data needed to perform the processing as described below in connection with FIG. 6.

Processor 570 is communicatively coupled with memory 580 which may be any computing memory suitable for storing data and instructions such as, for example, random access memory (RAM) and/or flash memory. Processor 570 is adapted to retrieve instructions and data from memory 580 as well as store data to memory 580. Processor 570 is also communicatively coupled to output device 150.

Output device 150 may be any device that is suitable for outputting data in the desired format. For example, output device 150 may be, for example, an electronic display, a printer, or a peripheral output for communicating data to another device.

Output 160 represents the output data which results from the processing performed by camera system 120. Output 160 may be represented in the form of a visual image on a display or printout, but also may be data communicated to another device for further processing.

Exemplary Method

Figure 6:
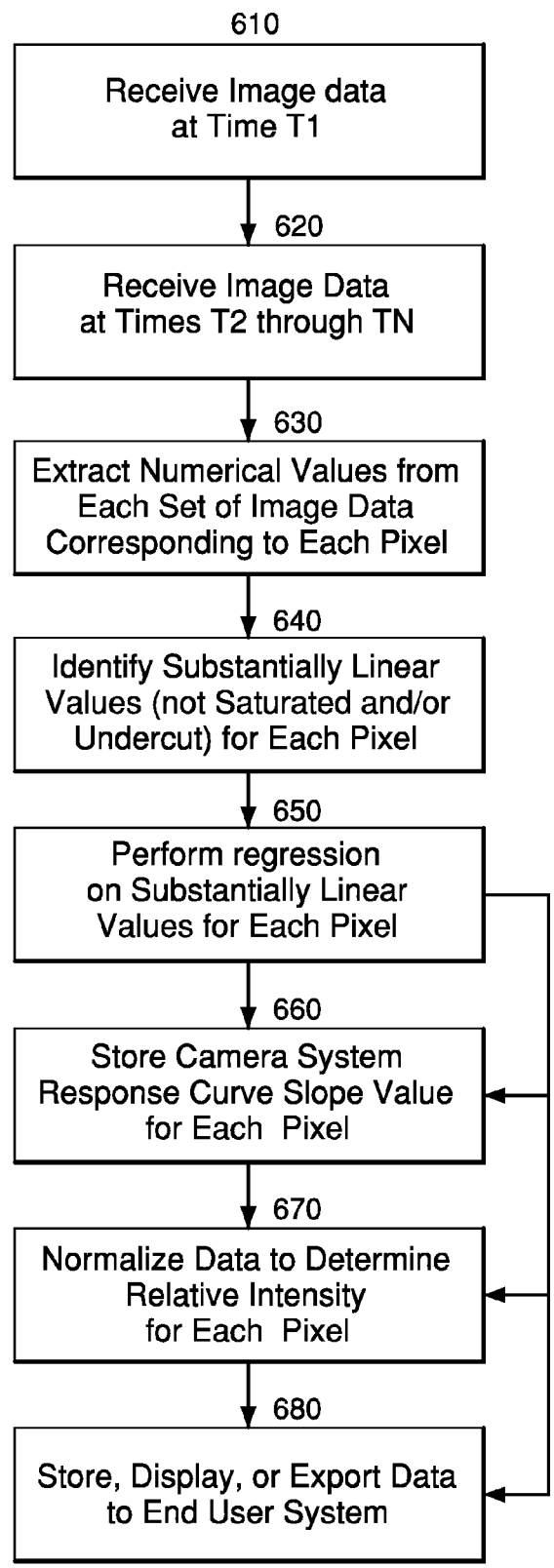
FIG. 6 is a flow diagram depicting a process for improving the dynamic range.

FIG. 6 is a flow diagram depicting a process for improving the dynamic range of an image. At step 610, image sensor 520 receives image response data for the light energy reflected from scene 110 at time $T_1$. The image response data may represent the values for pixels corresponding to discrete sections of an image corresponding to scene 110. For each pixel, an intensity value and an exposure time (or linear scaling of the exposure time) is received. Thus, the image intensity data may comprise a set of values, with each pixel having a corresponding response value. At step 620, image sensor 520 receives additional sets of image response data generated from the reflection from scene 110 at times $T_2$ through $T_n$. The number of separate sets of image response data that is collected, and the time period over which the data is collected may vary. Each of the sets of image response data is collected using a different exposure time. In an exemplary embodiment, 30 sets of data (i.e. 30 picture frames) may be collected over an interval of one-sixth second. Each time value, for example, $T_1$ through $T_n$, may correspond to an exposure time for the corresponding set of image response data.

At step 630, processor 570 extracts numerical values from each set of image data received during steps 610 and 620. The extracted numerical values correspond to each pixel in image sensor 520 for which data is desired. In an exemplary embodiment, the processing may be performed on each pixel for an entire image. In another exemplary embodiment, the processing may be performed for only a portion of the pixels in the image.

At step 640, the data sets for each pixel identified in step 630 are analyzed by processor 570. In an exemplary embodiment, the processing comprises deriving a plot of the response data as a function of time for each pixel. This allows for identification of the substantially linear portion of the response data plotted as a function of time. Evaluating response data as a function of time allows for the identification (and removal) of the portion of the response data that may reflect the limitations of the camera such as saturation, noise, undercut, etc. Thus, in an exemplary embodiment, the identified portion of the data for each pixel excludes the non-linear portions of the camera response curve corresponding to the undercut area (very low intensity outside of the camera's dynamic range) and the saturation area (very high intensity outside of the camera's dynamic range).

At step 650, processor 570 performs a regression analysis on the substantially linear identified data from step 640 for each pixel. Any acceptable method of performing a regression on the data for each pixel may be employed. In an exemplary embodiment, the regression analysis is a least squares analysis. The regression analysis is performed with the energy intensity values being a function of the exposure time.

The regression analysis derives a slope, mI, and an intercept, b, for each pixel. As noted above in connection with the discussion of FIG. 2, the ratio of $I_i$ to $I_j$ represents the ideal intensity levels between two pixels. The regression analysis performed on the linear response data identifies the slopes $mI_i$ and $mI_j$ between two pixels. A ratio of the slopes of the two pixels is substantially equivalent to the ratio of the actual intensity levels for the two pixels.

$$\frac{mI_i}{mI_j} = \frac{I_i}{I_j}$$

Those skilled in the art will appreciate that the derived values for mI represent an image that is substantially free of the inaccuracies introduced by camera limitations as discussed above.

At step 660, the results of the regression analysis may be stored in memory 580. In an exemplary embodiment, the data stored for each pixel reflects the slope derived at step 650.

At step 670, the resulting camera response curve slope values may be normalized to determine the relative intensity for each pixel. To do this, the substantially linear curve slope value for each pixel will be multiplied or divided by a single number to scale the output values to correspond to a particular desired output media. This normalization may result in a data set between 0 and 1, or any other designated range. For example, if a user requires that the data be displayed on an electronic display or monitor such as output 150, then the data set will be normalized to correspond to the dynamic range that can be displayed by the display.

At step 680, the processed response data from regression 650 may be displayed, stored, and/or exported to another system. For example, the response data may be displayed on a digital display, or printed on a printing device, or output to another system such as a machine vision system for further processing.

The image data and the corresponding image that results from the processing of FIG. 6 are substantially free of the inaccuracies discussed above. The processed image data accurately reflects the intensity and may have a zero intercept. Furthermore, the values obtained from regression may be stored as high precision floating point numbers and are not limited to the native pixel depth. Also, the noise introduced by the electronic of the system is substantially reduced by the regression analysis.

Exemplary Embodiments

In an exemplary embodiment, camera system 120 may comprise a commercially available camera device such as, for example, a PGR Dragonfly firewire digital camera. The PGR Dragonfly camera may be a color camera with Bayer RGGB mosaic filter pattern. The PGR Dragonfly digital camera may comprise a CCD array comprising 640×480 pixels and having an 8-bit (256-level) output. In an exemplary embodiment, single color pixel values are extracted (this camera can output RAW Bayer pixels without color conversion) to avoid the complications caused by spatial averaging of the color conversion algorithm and white balance settings. RAW image data may be, for example, the unprocessed output of the sensor or camera.

In this particular exemplary embodiment, three camera parameters are controlled by the processor: brightness, gain, and shutter. "Brightness" fine tunes the intercept b and "gain" adjusts the slope m. In the particular embodiment of the PGR Dragonfly, the native register values of "gain" do not have a simple linear relationship with m. The "shutter" control parameter varies the exposure time of each frame and can vary from 1/30 second to 1/8000 second. The register value of the "shutter" control parameter has a linear relationship to the exposure time as follows: $T=(S\times30)/(16,000\times F)$, where T is exposure time in second, S is the register value for "shutter" and F is the frame rate.

In an exemplary embodiment, the range of shutter time is divided into twenty (20) equal intervals, and twenty-one (21) images are taken with increasing exposure time for each successive image. While the particular embodiment uses twenty-one (21) images, it is possible to reduce the number of images further, down to ten, five, or even only two images, in order to increase the speed of the calculation process.

Because the "shutter" register value is simply a linear scaling of the actual exposure time, regression may be performed on the "shutter" register value. Compared to performing the regression on the actual exposure time in seconds, the difference is merely a uniform scaling that drops out of the calculations during the computation of intensity ratios.

Figure 7:
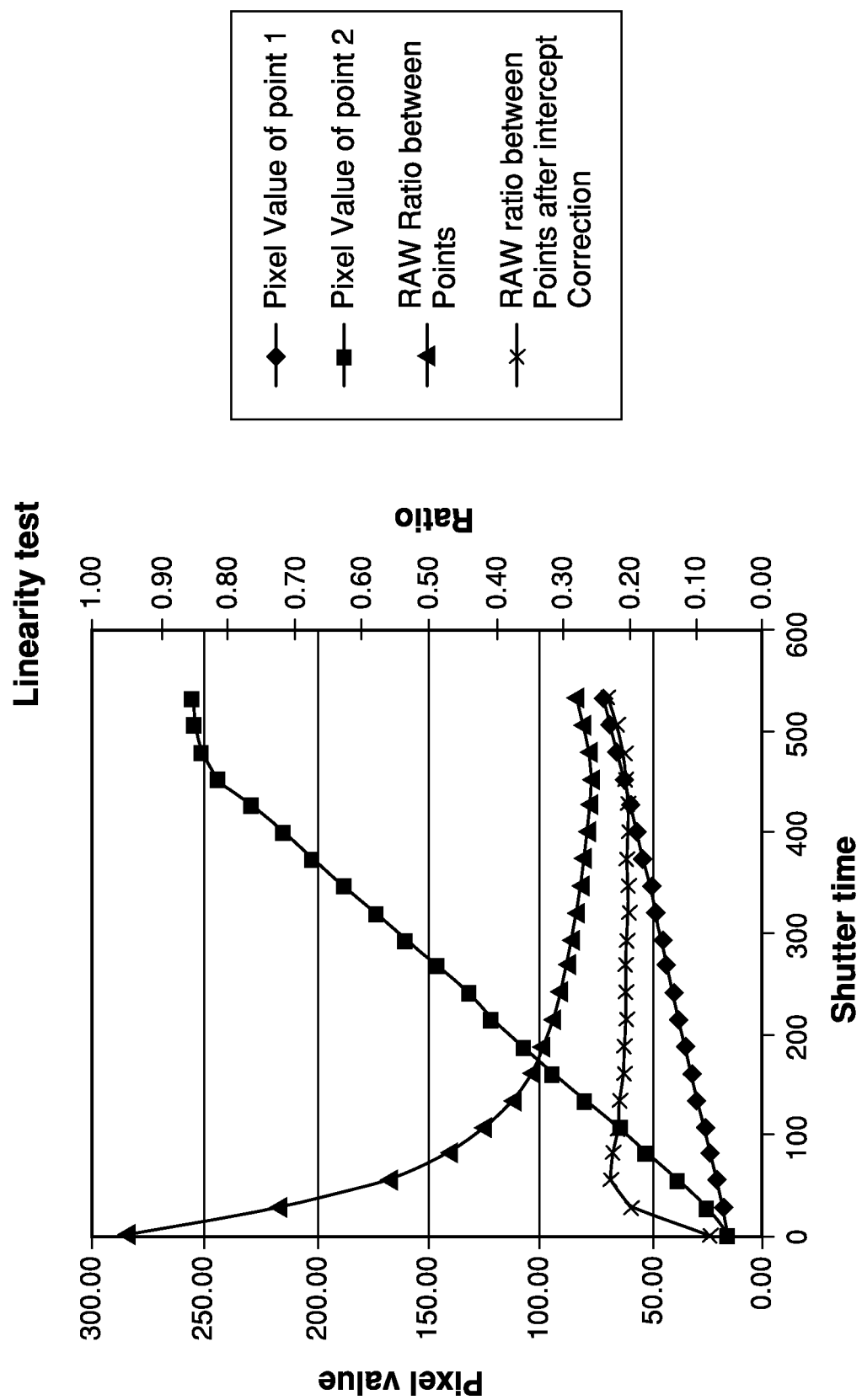
FIG. 7 is a diagram depicting a comparison of camera responses to image intensity levels recorded for two separate pixels.

FIG. 7 is a diagram depicting a comparison of the camera responses to scene intensity levels recorded by two separate pixels in image sensor 520. In order to collect the response data of FIG. 7, the camera aperture was set at F/#2.8 (most open aperture), the gain was set at 621 (in the middle of the camera's gain range, near the default setting), the brightness was set at 255 (the maximum value), and the shutter value was incrementally varied from 0 to 533 (the maximum value). Two points in the image were chosen, as recorded by two different pixels in the CCD array, in which one point had an actual intensity level higher than the other. The raw camera response values for each pixel were recorded for each of the twenty-one (21) separate image frames.

The diagram of FIG. 7 depicts the output values for each of the two sample pixels (reflected in the left-hand Y axis labels), for each of the twenty-one separate recorded images (reflected as shutter time along the X axis). The values from the first pixel are represented by the first series, and the values from the second pixel are represented by the second series. Also represented are the ratio between the RAW camera output values for each pixel (the third series), and the ratio of the third series corrected by subtracting each pixel's intercept, b, from its output value. The third and fourth series ratios are plotted using the right-hand Y axis labels.

Consistent with the process described above in connection with FIG. 6, the slope, mI, and intercept, b, for each of the two pixel data series were obtained by performing linear regression after first removing points effected by saturation and undercut. The coefficients of determination were 0.9987 for the first pixel and 0.9988 for the second pixel. As shown, the response curves of each of the two pixel series were substantially linear, except for the portion of the pixel 2 (higher intensity) response that became saturated (at the longer-exposure end of the data set). As a result of the regression, the intercept, b, values were determined to be 15.37 for the first pixel and 11.6 for the second pixel.

The fact that each pixel has a different intercept value prevents the RAW ratio represented in the third series from being an accurate representation of the true intensity ratio between the parts of the scene recorded by the two pixels. When these intercept values are removed, as in the fourth series, the adjusted RAW output ratio is substantially constant over the course of the 21 data sets. However, this ratio becomes less accurate in the low-shutter-time portion of the curve (during which the noise of the electronic components affects the camera output) and in the high-shutter-time portion of the curve (during which the output for pixel 2 becomes saturated). The calculated regression slope values for the data sets of the two pixels are 0.1041 and 0.5066, and the ratio of these two calculated slope values is 0.2055, which is very close to the substantially constant value in the liner portion of the fourth data series (intercept-corrected RAW pixel output ratio). This indicates that using the slope value from regression as the new pixel value representation is a close approximation for computation of the ratios between pixel values.

Figure 8:
FIG. 8 is a representation of an image created by taking the RAW camera output and normalizing the output.
Figure 9:
FIG. 9 is a representation of the image of FIG. 8 created by taking the regression-calculated intensity ratio data and normalizing the output.

FIGS. 8-18 are diagrams comparing RAW camera output data with images generated using the regression process described herein. FIG. 8 is a representation of an image, created by taking the RAW camera output, and normalizing the output to fit an 8-bit (256-level) dynamic range of a printer or display monitor. FIG. 9 is a representation of the same image, created by taking the regression-calculated more accurate intensity ratio data, and normalizing the output to fit an 8-bit (256-level) dynamic range of a printer or display monitor.

As can be seen in FIGS. 8 and 9, it is difficult to distinguish the improved accuracy of the scene intensity information on a printer or monitor that only has an 8-bit gray level dynamic range. The high dynamic range regression-calculated image data set can be converted back into a compatible 8 bit data format for display on traditional monitors or for printing on traditional printers by rescaling the maximum pixel value to 255 and rescaling the remaining data to discrete integer values. However, the result of this rescaling is a picture that "looks" (to the human eye) very much like a RAW camera output image, unless there is significant amount of saturation in the regular image or the entire regular image is very dark overall. This result is due to the fact that the superior precision gained in the high dynamic range images are lost in the processing of fitting the data back into the limited 8-bit data for display or printout. In a sense, this is a verification that the new way of constructing high dynamic image is able to reproduce an image that is similar to that produced by the RAW camera output.

Figure 10:
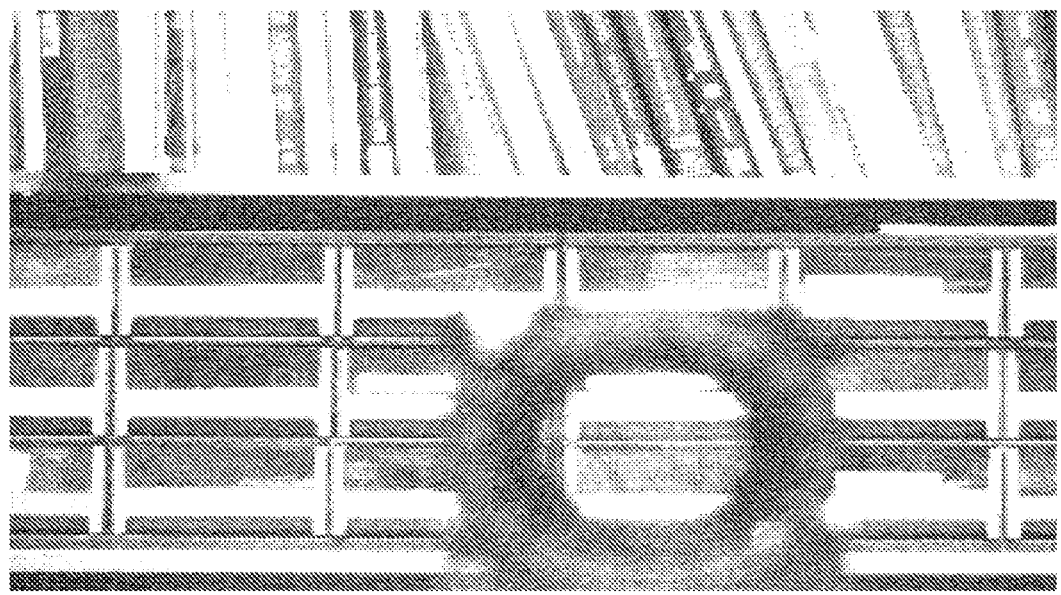
FIG. 10 is a representation of an image created by taking the RAW camera output, normalizing the output, and then multiplying the data by a constant.
Figure 11:
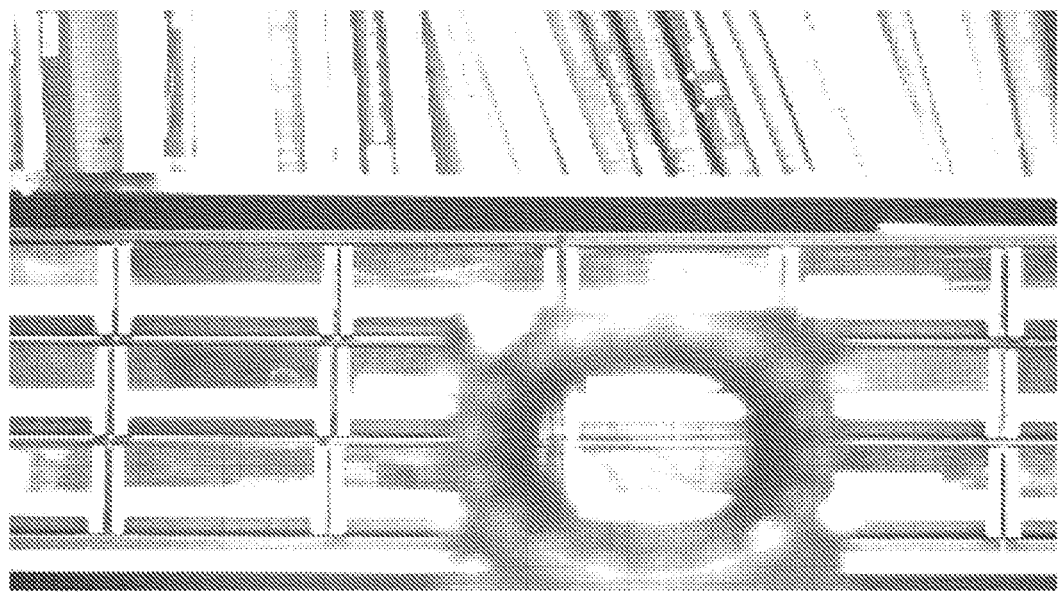
FIG. 11 is a representation of the image of FIG. 10 created by taking the regression-calculated intensity ratio data, normalizing the output, and then multiplying the data by a constant.

FIG. 10 is a representation of an image, created by taking the RAW camera output, normalizing the output to fit an 8-bit (256-level) dynamic range of a printer or display monitor, and then multiplying the data by 10, so that only the darkest 10% of the image is unsaturated. FIG. 11 is a representation of the same image, created by taking the regression-calculated more accurate intensity ratio data, normalizing the output to fit an 8-bit (256-level) dynamic range of a printer or display monitor, and then multiplying the data by 10, so that only the darkest 10% of the image is unsaturated.

Thus, FIGS. 10 and 11 significantly increase the contrast of the image shown in FIGS. 8 and 9, to allow examination of the more accurate regression-calculated image intensity data that is present in the darkest 10% of the images (with the brightest 90% fully saturated). In this way, the improved data set generated by the disclosed regression method can be more easily appreciated by a human viewer.

As can be seen in FIG. 10, the dark areas in FIGS. 8 and 9 are brightened, so it easier to see the details in the darker areas. However, the RAW camera output data contains a substantial amount of noise in the darker areas. As can be seen in FIG. 11, in the new high dynamic range image, however, the dark areas are revealed with significantly less noise. This illustrates the additional intensity value information in the darkest areas of the picture that result from the regression calculations. This additional intensity value information is critical for use in some machine vision, polarization, and other applications.

The disclosed systems and methods may be employed in connection with systems and methods for image polarization. Polarization imaging computations rely heavily on the ratio of image intensity taken at different polarization filter orientations. The polarization parameters "degree of polarization" and "angle" of polarization both depend only on the ratios of polarization intensities, not on the absolute intensity values. Therefore, the regression-calculated high dynamic range imaging method described herein produces dramatic improvements in these two polarization computation parameters, which can be seen even when displayed by a traditional 8-bit monitor display and printer.

Figure 12:
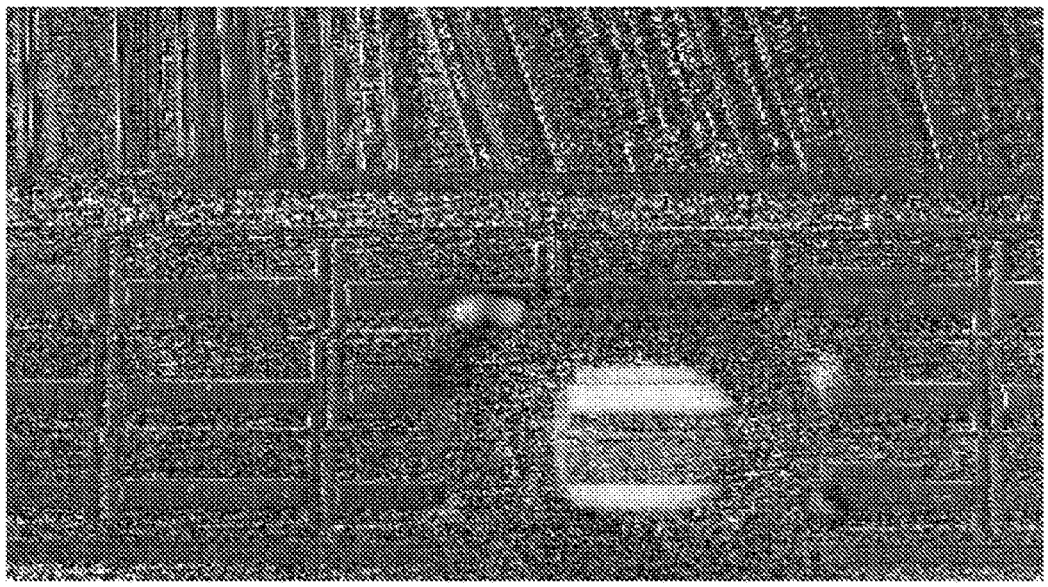
FIG. 12 is a representation of an image created by taking the RAW camera output, performing polarization calculations, and normalizing the output.
Figure 13:
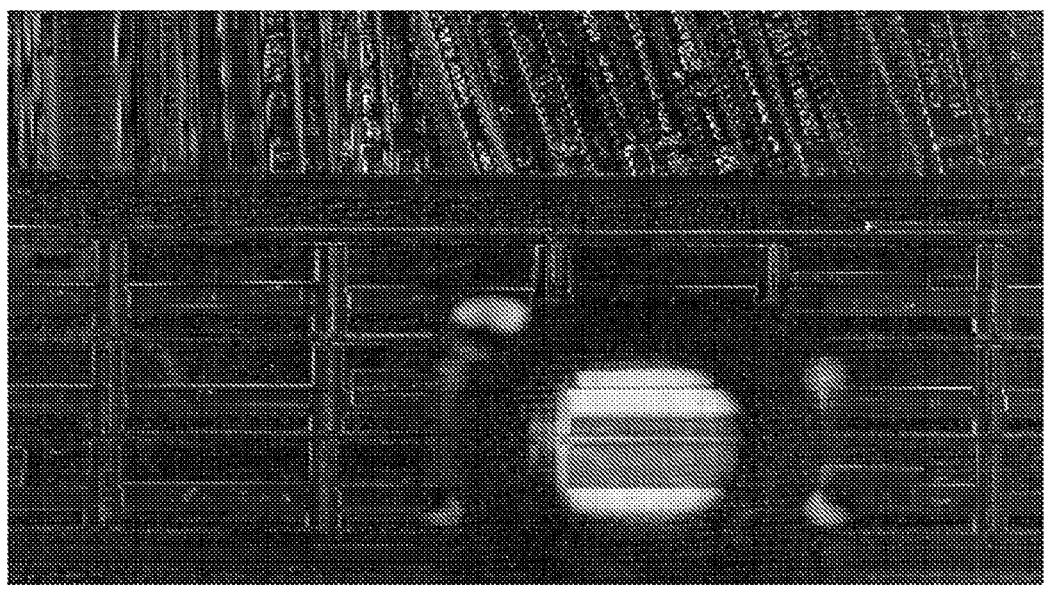
FIG. 13 is a representation of the image of FIG. 11 created by taking the regression-calculated intensity ratio data, performing polarization calculations, and normalizing the output.

FIGS. 12 and 13 are diagrams comparing depictions of the RAW camera output data with the regression-calculated intensity ratio data, for use in polarizing imaging. FIG. 12 is a representation of an image, created by taking the RAW camera output, performing polarization calculations, and normalizing the output to fit an 8-bit (256-level) dynamic range of a printer or display monitor. FIG. 13 is a representation of the same image, created by taking the regression-calculated more accurate intensity ratio data, performing polarization calculations and normalizing the output to fit an 8-bit (256-level) dynamic range of a printer or display monitor.

Figure 14:
FIG. 14 is a pseudo-color representation of a polarization angle image created by taking the RAW camera output, performing polarization calculations, and normalizing the output.
Figure 15:
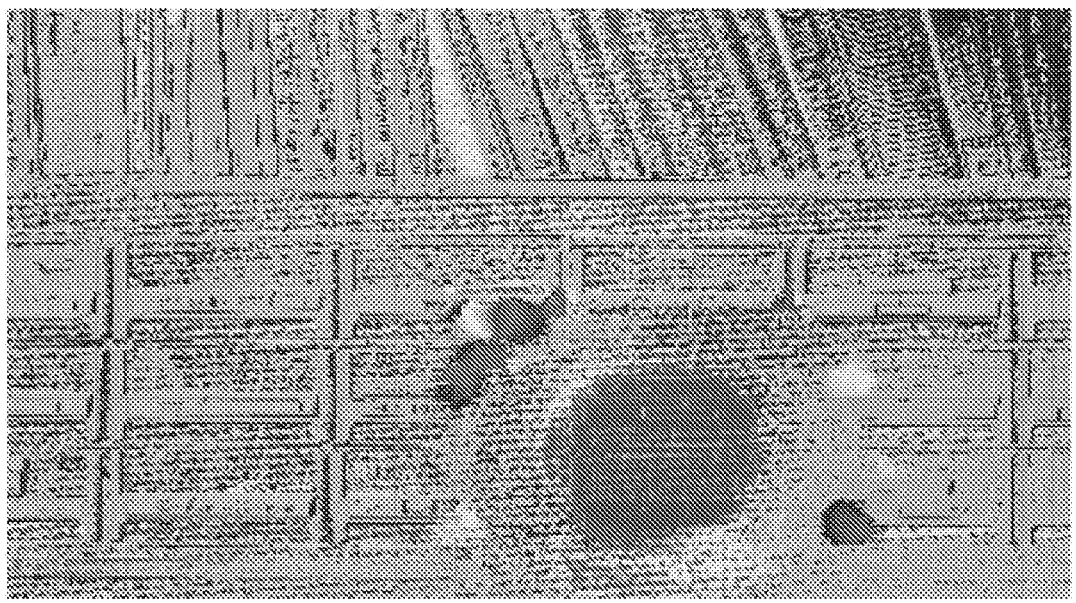
FIG. 15 is a pseudo-color representation of the same polarization angle image of FIG. 14 created by taking the regression-calculated intensity ratio data, performing polarization calculations, and normalizing the output.

FIG. 14 is a pseudo-color representation of a polarization angle image, created by taking the RAW camera output, performing polarization calculations, and normalizing the output to fit an 8-bit (256-level) dynamic range of a printer or display monitor. FIG. 15 is a pseudo-color representation of the same polarization angle image, created by taking the regression-calculated more accurate intensity ratio data, performing polarization calculations and normalizing the output to fit an 8-bit (256-level) dynamic range of a printer or display monitor.

The circular object near the center of FIGS. 12-15 is a rotating mount of a linear polarizer with angle set to zero (horizontal) degrees, to act as a known polarization target. Inside the circular area of the polarizer, a high degree of polarization can be seen, and this area is depicted as a solid red color (indicating zero angle).

Figure 16:
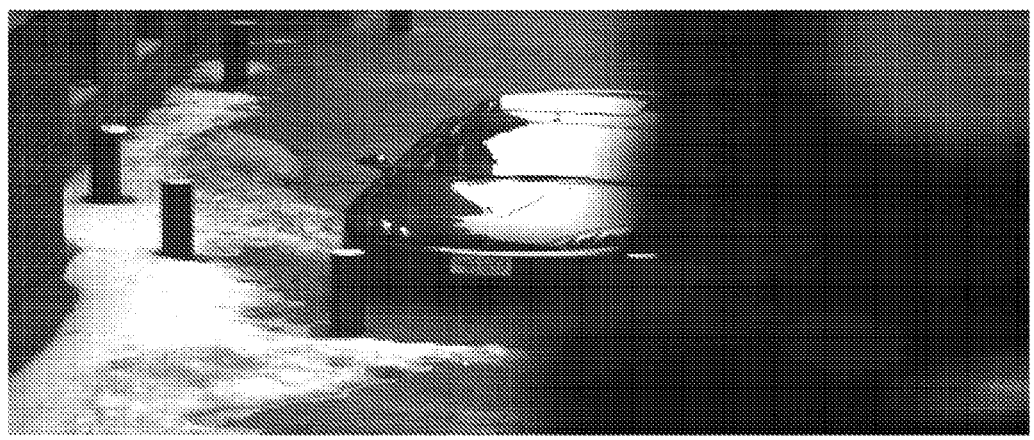
FIG. 16 is a diagrams comparing created from the RAW camera output data for a scene with high saturation.
Figure 17:
FIG. 17 is a diagram depicting the angle of polarization parameter that is computed with RAW camera output data.
Figure 18:
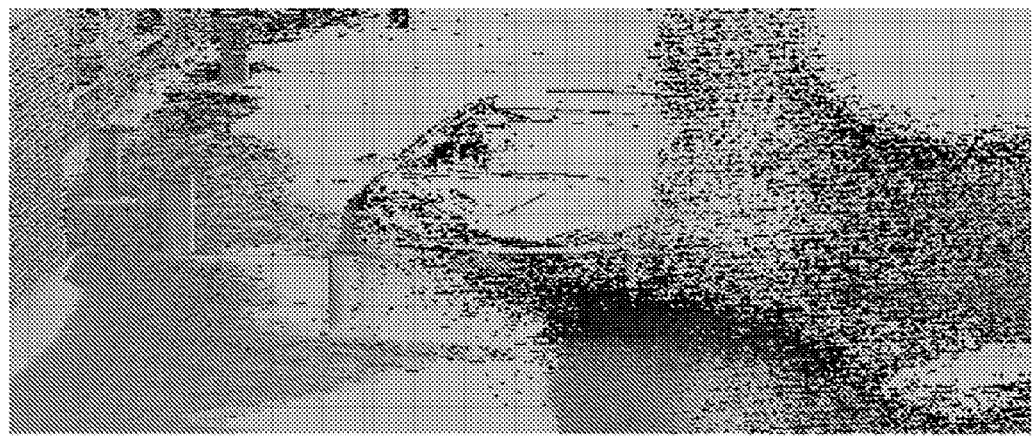
FIG. 18 is a diagram depicting the angle of polarization parameter computed using regression-calculated intensity ratio data.

FIGS. 16-18 are diagrams comparing depictions of the RAW camera output data with the regression-calculated intensity ratio data, for an outdoor scene with high saturation. FIG. 16 displays the actual RAW camera output data recorded from the scene. FIG. 17 displays the angle of polarization parameter that is computed from the RAW camera output data. This data contains inaccurate intensity values, in the saturated areas of the image. FIG. 18 displays the angle of polarization parameter that is computed from the regression high dynamic range analysis disclosed herein. This regression method preserves the intensity value information for the brightest portions of the scene, which are not accurately recorded in FIG. 17. The polarization components U and A are not ratios of intensity values. They are arithmetic sums and subtractions that have similar characteristics as the original RAW image shown in FIG. 16.

Thus, exemplary embodiments of improved digital camera systems and methods of processing digital image data have been disclosed herein. In one exemplary embodiment, a digital camera system is adapted to identify the substantially linear portion of pixel response data and perform regression analysis on the data. The values from the regression represent a more accurate reading of the actual received intensity levels.

While the exemplary embodiments demonstrate high dynamic range using variation in exposure time, it is appreciated that the procedures disclosed herein may be extended to use other camera parameters that have known functional effects and which can be fitted robustly. Some of the improvements that may result from use of the disclosed procedures include, for example, (1) better usage of the limited digital and analog dynamic range of a regular camera, (2) exclusion of undercut and saturation data points, and (3) regression of good quality data points that significantly reduces the effects of random additive noise and the effects of differences in black level.

With respect to better use of limited digital and analog dynamic range of a camera, there are several camera parameters that may be adjusted when a picture is taken. Therefore, the same scene point can be imaged either as a dark pixel, a medium bright pixel or a very bright pixel, for example, by changing aperture, brightness, gain, or a combination of these parameters. Using the RAW camera response output may result in inaccurate intensity information when there are very bright and very dark areas in the same scene. Therefore, the ratio of intensity exceeds the maximum digital or analog dynamic range of the camera. If it is desired to avoid saturation of the bright area (for example, from glare or a bright sky area), then the dark areas may be recorded as very small discrete integer values. This low range of possible values at the low end of the intensity spectrum may significantly reduce the accuracy of representation of this intensity information.

One interesting implication is that with the imaging process described herein, it may be useful to take brighter pictures (so that the intensity information in dark areas is captured), while in traditional methods, it is often necessary to take dark pictures to avoid saturation of the high-intensity end of the data. In the regression procedure described herein, high-intensity value pixels are represented by more digits than in previous systems. Accordingly, small differences in intensity can be more finely recorded (e.g., intensity values 250 and 251). Small differences in intensity in low-intensity integer values (e.g., less than 15, so only 4 bits of digits are available) and small variations in intensity at the high end (e.g., 250 and 251) largely disappear in the process of digitization. In an embodiment of the systems and methods disclosed herein, the same intensity value information may be digitized at different allowable integer value ranges from small to large. Performing regression on these values may significantly reduce the impact of digitization error.

The process described herein may also result in noise reduction without resorting to spatial convolution. There exist many noise reduction methods that rely on spatial convolution. However, such methods imply filtering out all high frequency features, regardless of whether the features are real scene features or false features due to noise.

The high dynamic range imaging method described herein improves image quality compared to using RAW pixel values directly, particularly when used for computation of intensity values that involves ratio computation (such as with polarization).

The foregoing description is provided for the purpose of explanation and is not to be construed as limiting the potential embodiments. While embodiments have been described with reference to preferred embodiments or preferred methods, it is understood that the words which have been used herein are words of description and illustration, rather than words of limitation. Furthermore, although embodiments have been described herein with reference to particular structure, methods, and embodiments, the potential embodiments are not intended to be limited to the particulars disclosed herein, as the potential embodiments extend to all structures, methods and uses that are within the scope of the appended claims, including alternative embodiments. For example, potential embodiments may comprise cameras, computing devices, vision systems, and/or any other system that may benefit from the concepts described herein. Similarly, the disclosed systems and methods may be used, for example, in any application where it is beneficial to calculate ratios of variables output by a sensor. For example, while the embodiments are described as being adapted for use in the calculation of ratios of pixel intensity values, possibly for use with polarization imaging computations, the potential embodiments may be used to improve the accuracy of ratios of sensed temperature, weight, voltage, or any other variable that is sensed or output by a sensor having a linear response to an input variable. Further, several advantages have been described that flow from the structure and methods; the potential embodiments are not limited to structure and methods that encompass any or all of these advantages. Those skilled in the relevant art, having the benefit of the teachings of this specification, may effect numerous modifications to the embodiments as described herein, and changes may be made without departing from the scope and spirit of the potential embodiments as defined by the appended claims.

What is claimed:

1. A method for processing digital image data, comprising:
   receiving a plurality of sets of image data representing an image at different times;
   extracting a first set of intensity values corresponding to a first pixel from the plurality of sets of image data, each set of image data having a corresponding time value, each intensity value in the first set being extracted from a corresponding set of image data;
   identifying a first subset of the first set of intensity values excluding saturation and undercut data points, the intensity values of the first subset having a substantially linear relationship with each other;
   performing regression on the first subset to generate a digital representation of the first pixel of the image, the regression deriving a first regression slope corresponding to the first pixel;
   extracting a second set of intensity values corresponding to a second pixel from the plurality of sets of image data, each intensity value in the second set being extracted from a corresponding set of image data;
   identifying a second subset of the second set of intensity values excluding saturation and undercut data points, the intensity values of the second subset having a substantially linear relationship with each other;
   performing regression on the second subset to generate a digital representation of the second pixel of the image, the regression deriving a second regression slope corresponding to the second pixel; and
   normalizing the first regression slope and the second regression slope by multiplying the first regression slope and the second regression slope by a normalizing value, the normalizing deriving a first relative intensity value corresponding to the first pixel and a second relative intensity value corresponding to the second pixel.

2. The method of claim 1, further comprising:
   storing the first regression slope and the second regression slope; and
   storing the first relative intensity value and the second relative intensity value.

3. The method of claim 1, further comprising:
   spatially arranging the first pixel and the second pixel to create an image.

4. The method of claim 1, wherein each time value corresponds to an exposure time for the corresponding set of image data.

5. The method of claim 1, further comprising:
   performing polarization calculations on the first regression slope and the second regression slope.

6. The method of claim 1, wherein the first set of intensity values comprises one intensity value from each set of image data.

7. The method of claim 1, further comprising:
   receiving the plurality of sets of image data, the receiving of the plurality of sets of image data comprising receiving intensity values corresponding to a plurality of pixels defined for an image.

8. A data processing system, comprising:
   a processor;
   a memory communicatively coupled with the processor, the memory having instructions stored thereon that when executed by said processor cause said processor to perform the following:
   receiving a plurality of sets of image data representing an image at different times;
   extracting a first set of intensity values from the plurality of sets of image data, each set of image data having a corresponding time value, each intensity value in the first set being extracted from a corresponding set of image data, the first set of intensity values corresponding to a first pixel;
   identifying a first subset of the first set of intensity values excluding saturation and undercut data points, the intensity values of the first subset having a substantially linear relationship with each other;
   performing regression on the first subset to generate a digital representation of the first pixel of the image, the regression deriving a first regression slope corresponding to the first pixel;
   extracting a second set of intensity values from the plurality of sets of image data, each intensity value in the second set being extracted from a corresponding set of image data, the second set of intensity values corresponding to a second pixel;
   identifying a second subset of the second set of intensity values excluding saturation and undercut data points, the intensity values of the second subset having a substantially linear relationship with each other;

performing regression on the second subset to generate a digital representation of the second pixel of the image, the regression deriving a second regression slope corresponding to the second pixel; and normalizing the first regression slope and the second regression slope by multiplying the first regression slope and the second regression slope by a normalizing value, the normalizing deriving a first relative intensity value corresponding to the first pixel and a second relative intensity value corresponding to the second pixel.

9. The system of claim 8, the memory having further instructions stored thereon that when executed by said processor cause said processor to perform the following:

storing the first regression slope and the second regression slope; and storing the first relative intensity value and the second relative intensity value.

10. The system of claim 8, the memory having further instructions stored thereon that when executed by said processor cause said processor to perform the following:

spatially arranging the first pixel and the second pixel to create an image.

11. The system of claim 8, wherein each time value corresponds to an exposure time for the image sensor.

12. The system of claim 8, the memory having further instructions stored thereon that when executed by said processor cause said processor to perform the following:

performing polarization calculations on the first regression slope and the second regression slope.

13. The system of claim 8, wherein the first set of intensity values comprises one intensity value from each set of image data.

14. The system of claim 8, the memory having further instructions stored thereon that when executed by said processor cause said processor to perform the following:

receiving the plurality of sets of image data by receiving intensity values corresponding to a plurality of pixels defined for an image.

15. The system of claim 8, further comprising an image sensor communicatively coupled with the processor, the image sensor adapted to capture image data.

16. The system of claim 15, further comprising a lens communicatively coupled with the image sensor, the lens adapted to focus an image.

17. A method for processing data, comprising:

receiving values for a plurality of sensor outputs, the values corresponding to measurements taken at at least two points in time;

extracting a first set of values of said sensors outputs from the plurality of sensor outputs, the first set of values having a corresponding time value;

for each of the plurality of sensor outputs, deriving a regression slope for values in the first set of values that are substantially linear in a measuring range of the plurality of sensor outputs;

for each of the plurality of sensor outputs, storing the derived regression slope as a digital representation of the measurements at said at least two points in time; and normalizing first and second regression slopes by multiplying the first regression slope and the second regression slope by a normalizing value, the normalizing deriving a first relative intensity value corresponding to a first pixel of the digital representation and a second relative intensity value corresponding to a second pixel of the digital representation.

18. The method of claim 17, further comprising:

for each of the plurality of sensor outputs, normalizing the derived regression slope to derive a relative sensor output value; and for each of the plurality of sensor outputs, storing the relative sensor output value.

19. The method of claim 18, further comprising:

spatially arranging the plurality of sensor outputs, each having a relative sensor output value, the plurality of sensor outputs creating an image.

20. The method of claim 18, wherein each point in time value corresponds to a measurement time for the plurality of sensor outputs.

21. The method of claim 17, further comprising:

for each of the plurality of sensor outputs, performing polarization calculations on the derived regression slope.

22. The method of claim 17, wherein receiving values for a plurality of sensor outputs comprises receiving sensor output values corresponding to a plurality of sensor outputs defined for an image.

* * * * *

UNITED STATES PATENT AND TRADEMARK OFFICE
CERTIFICATE OF CORRECTION

PATENT NO.        : 8,693,803 B2
APPLICATION NO. : 12/677689
DATED             : April 8, 2014
INVENTOR(S)       : Shih-Schon Lin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this

Twenty-ninth Day of September, 2015

Michelle K. Lee
*Director of the United States Patent and Trademark Office*